United States Patent [19]

Rothbuhr et al.

[11] 4,292,291
[45] Sep. 29, 1981

[54] PROCESS FOR THE PRODUCTION OF FURNACE BLACK

[75] Inventors: Lothar Rothbuhr, Hermulheim; Josef Witte, Bruhl, both of Fed. Rep. of Germany

[73] Assignee: Deutsche Gold- Und Silber-Scheideanstalt Vormals Roessler, Frankfurt, Fed. Rep. of Germany

[21] Appl. No.: 48,770

[22] Filed: Jun. 15, 1979

[30] Foreign Application Priority Data

Jun. 24, 1978 [DE] Fed. Rep. of Germany ....... 2827872

[51] Int. Cl.³ .......................... C01B 31/02; C09C 1/48
[52] U.S. Cl. ..................... 423/450; 423/449
[58] Field of Search ................ 423/449, 450; 422/150

[56] References Cited

U.S. PATENT DOCUMENTS

| | | | |
|---|---|---|---|
| 2,672,402 | 3/1954 | Stokes | 423/450 |
| 2,926,073 | 2/1960 | Robinson | 422/156 |
| 3,369,870 | 2/1968 | Ganz et al. | 422/150 |
| 3,438,732 | 4/1969 | Morel | 423/450 |

FOREIGN PATENT DOCUMENTS

| | | |
|---|---|---|
| 1107872 | 5/1967 | Fed. Rep. of Germany . |
| 2131903 | 6/1971 | Fed. Rep. of Germany . |
| 1011093 | 4/1952 | France . |
| 1044788 | 6/1953 | France . |
| 1064687 | 12/1953 | France . |
| 991483 | 5/1965 | United Kingdom ................ 423/450 |

OTHER PUBLICATIONS

Ullmanns Enzyklopaedie der Technischen Chemie, vol. 14, (1963), p. 800.

*Primary Examiner*—O. R. Vertiz
*Assistant Examiner*—Gregory A. Heller
*Attorney, Agent, or Firm*—Cushman, Darby & Cushman

[57] ABSTRACT

There is set forth a process for the production of furnace black comprising spraying an oily carbon black forming material into a stream of hot combustion gases produced by reaction of fuel with reaction air, chilling and recovery of the carbon black by separation from the waste gases during which the reaction air is heated by means of waste gases. The waste gases are burned in a combustion apparatus by means of secondary air in order to heat the reaction air to a temperature between 600° and 1,250° C., preferably between 800° and 1100° C. and the thus heated reaction air is then introduced into the process.

11 Claims, 3 Drawing Figures

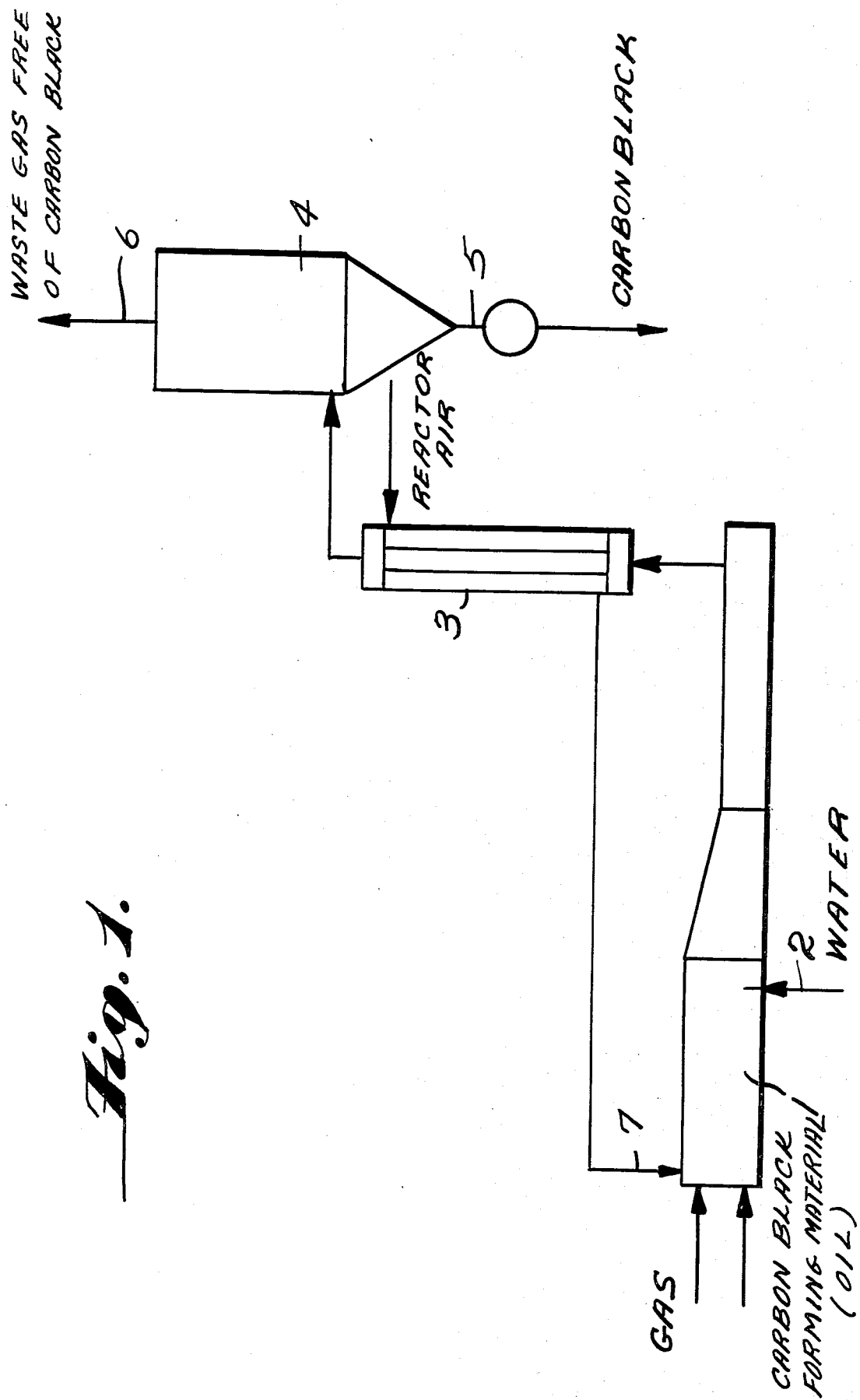

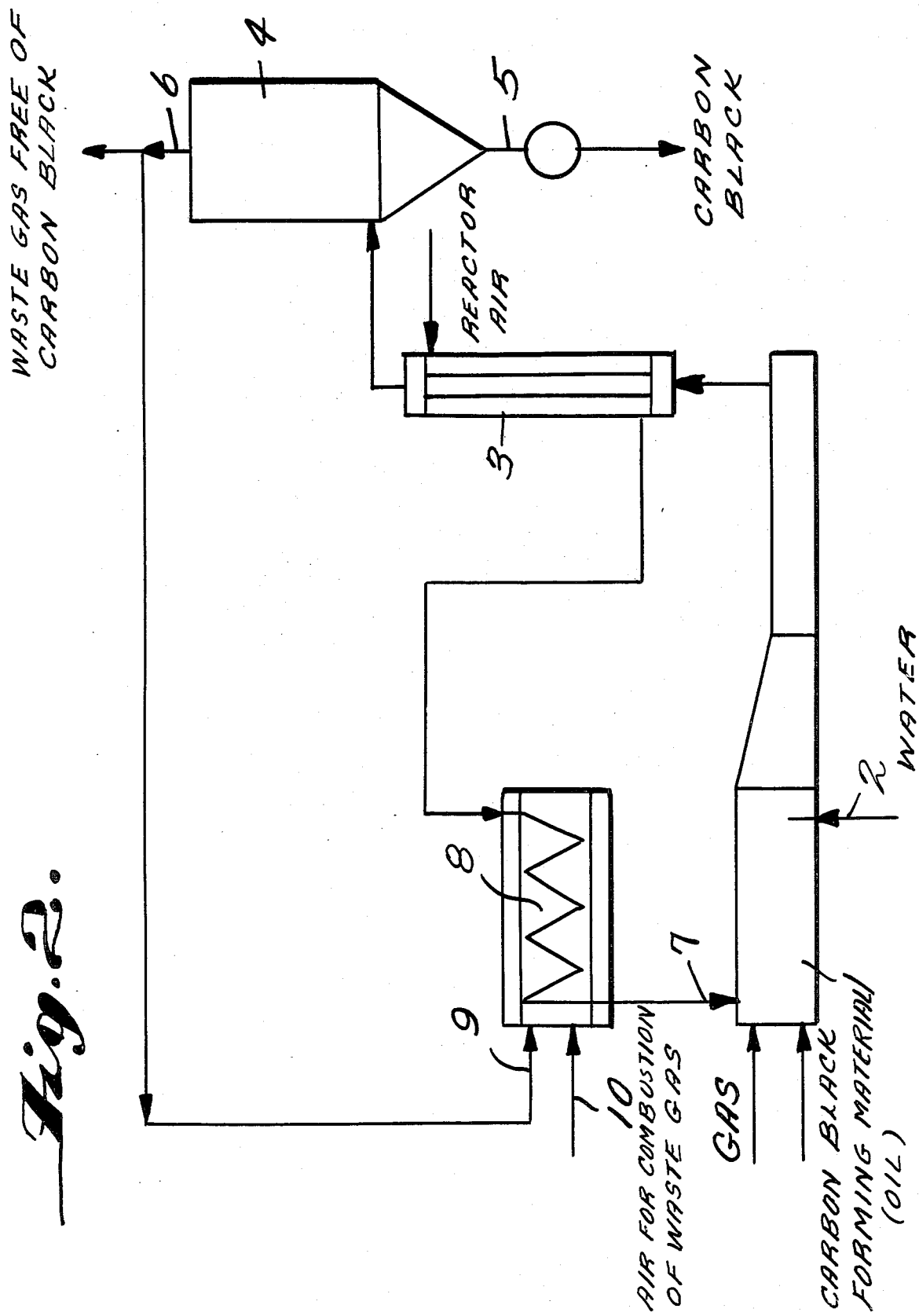

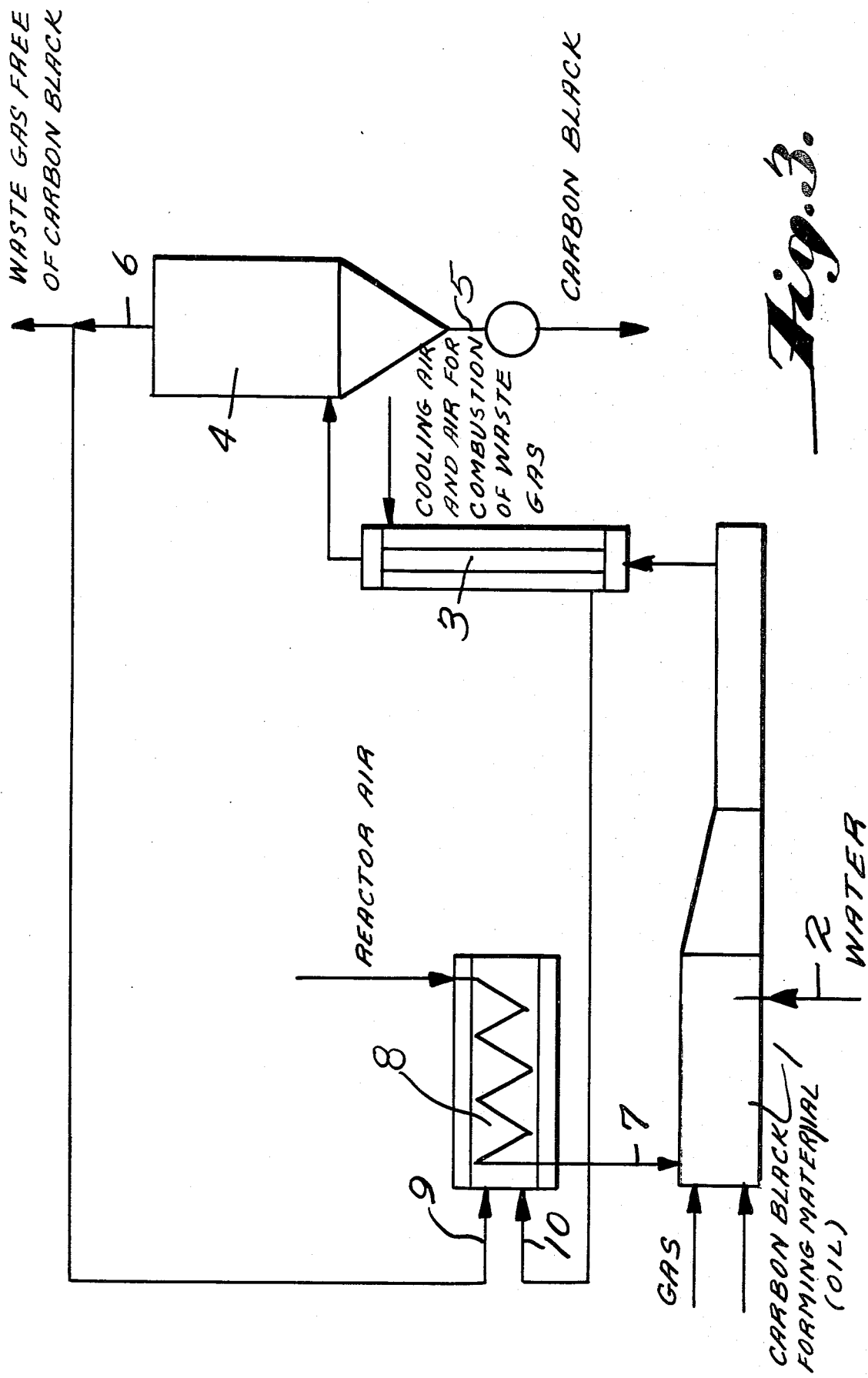

PROCESS FOR THE PRODUCTION OF FURNACE BLACK

BACKGROUND OF THE INVENTION

The invention is directed to a process for the production of furnace black by spraying oily carbon black forming material into a stream of hot combustion gases produced by the reaction of fuel with reaction air, chilling and recovery of the carbon black by separation from the waste gases during which the reaction air is preheated by means of the waste gases.

The furnace black process is a known process for the production of carbon black. For example it is described in Ullmanns Enzyklopadie der technischen Chemie, Vol. 14 page 800 (1963).

In a furnace black process carbon black is produced from a carbon black forming oil while hot combustion gases are produced by means of reaction air and a fuel, and the carbon black forming oil is atomized in these hot combustion gases. There is formed a carbon black-waste gas-aerosol which is cooled down. Subsequently the carbon black formed is separated from the waste gas, e.g. by means of a filter plant and the waste gas, in a given case, flared.

It is now known to conduct the waste gas over a heat exchanger and thus to preheat the reaction air and to return it again to the process for production of the carbon black (compare, e.g. Eideneiner German Pat. No. 2,131,903).

The process according to the state of the art, however exhibits various inadequacies and disadvantages.

Since the temperature of 720°–750° C. cannot be exceeded in carbon black containing waste gases in order that the carbon black quality is not influenced in a negative manner, the degree of preheating the reaction air is limited.

In uncertain weather conditions the preheating temperature also varies and therewith the carbon black quality because carbon black reactors and heat exchanger customarily are installed in the open air.

The carbon black containing waste gases flowing through the tubes or spirals cause a deposit of carbon black coatings on the surface of contact of the heat exchanger. The deposits in the production of low structured blacks and blacks with a certain content of residual oil are particularly thick. An insulation occurs through the deposits on the metallic surface so that the heat transfer is very poor and only a small heating of the reaction air takes place.

Because of these disadvantages in the furnace black process the temperature of the preheated air can only reach a temperature of 400°–560° C.

SUMMARY OF THE INVENTION

According to the invention there is developed a process for the production of furnace black comprising spraying an oily carbon black forming material into a stream of hot combustion gases produced by reaction of fuel with reaction air, chilling and recovery of the carbon black by separation from the waste gases during which the reaction air is heated by means of the waste gases. The waste gases are burned in a combustion apparatus by means of secondary air in order to heat the reaction air to a temperature between 600° and 1250° C., preferably between 800° and 1100° C. and the thus heated reaction air is then introduced into the process.

In this way the reaction air can be heated by heat exchange with the waste gases and subsequently brought to the desired final temperature by means of the combustion apparatus.

In a given case the secondary air can additionally be heated in a heat exchanger by means of the waste gases.

In a preferred form of the invention the waste gases can be burned in a combustion apparatus by means of secondary air during which there is employed for each $Nm^3$ (standard cubic meter) of waste gas secondary air in an amount of 0.35 to 0.70 $Nm^3$, preferably 0.45 to 0.55 $Nm^3$, an oxygen excess of 0.2 to 0.8 volume% as well as a residence time of 0.5 to 1.5 seconds in the combustion apparatus.

The process of the invention points out a way by which a higher preheating of the reaction air is possible using the waste gases formed in this process and how the furnace black process can be operated with a substantially greater saving in energy than previously. The invention is not limited to a specific type of reactor, there can be employed all types of carbon black reactors.

In a preferred illustrative form of the invention there can be used a reactor according to German OS No. 2,530,371 and related Rothbuhr U.S. application Ser. No. 699,373 filed June 25, 1976 now U.S. Pat. No. 4,179,494. The entire disclosure of Rothbuhr is hereby incorporated by reference and relied upon.

The process of the invention is based on the fact that the waste gases from carbon black still contain, besides a non-combustible content of nitrogen and steam, still considerable portions of the burnable gases hydrogen and carbon monoxide. These are burned with secondary air during which temperatures of 1,000° to 1,300° C. arise. The combustion apparatus is provided with a heat exchange apparatus, e.g. made of metal pipes, tubes based on ceramics or other exchange surfaces, which are used to preheat the reaction air up to temperatures of about 1,250° C.

A corresponding combustion apparatus can be the apparatus described in Flasskamp, German AS No. 1,107,872, whereby a heat exchange apparatus must be connected or installed at the outlet side. Through this procedure the utilization of energy of the process can be improved considerably, the hourly carbon black production at given regulated conditions increased and the oil yield improved.

BRIEF DESCRIPTION OF THE DRAWINGS

The invention will be best understood in connection with the drawings wherein:

FIG. 1 is a schematic presentation of a process according to the state of the art;

FIG. 2 is a schematic presentation of the process of the invention during which the reaction air is additionally preheated by way of a heat exchanger; and FIG. 3 is a schematic representation of the process of the invention during which the secondary air is additionally preheated by means of a heat exchanger.

In the drawings like numerals refer to like parts.

Referring more specifically to FIG. 1 there are produced hot combustion gases in reactor 1 from reaction air and fuel gas. The carbon black forming material (mostly carbon black forming oil) is sprayed into the hot combustion gases. Thereby there is formed a suspension of finely divided carbon black in a still combustible waste gas. By spraying in water at the quench 2, the temperature of the carbon black containing waste gases is cooled to 600°–750° C., so that secondary reactions of the carbon black are prevented. The carbon black containing waste gas is then sent through one or more heat exchangers 3 whereby the waste gas is cooled to such an extent that conventional separating apparatus such as cyclones or filters 4 can be used to remove the carbon black from the waste gas. The carbon black is discharged from the system by way of outlet 5 and further worked up. The waste gas substantially free from carbon black flows out by way of outlet 6. The reaction air is led through the heat exchanger 3 in countercurrent flow to the carbon black containing waste gases, warmed there and is supplied to the reactor 1 via the reaction air inlet 7.

According to FIG. 2 the reactor 1 is operated with gas and reaction air and carbon black forming material sprayed in. After spraying in water via the quench 2 the carbon black containing waste gas stream is cooled through the heat exchanger 3 and the carbon black separated out in the separator apparatus 4 and carried out via the outlet 5. A portion of the waste gases freed from carbon black and flowing via outlet opening 6 of the separator apparatus 4 is now supplied via the inlet 9 to the combustion apparatus 8 situated near the reactor 1. The combustion apparatus contains pipes, e.g. of high heat resistant metal. Through the burning of the waste gas with the secondary air supplied via the inlet 10 of the combustion apparatus there are produced high temperatures of 1,000° to 1,300° C. The reaction air is first preheated by the heat exchanger 3 (during which the carbon black containing waste gas is cooled simultaneously) and subsequently through the pipes in the combustion apparatus 8 brought to a substantially higher temperature than is possible through the sole use of the heat exchanger 3. Subsequently the reaction air is supplied via the inlet 7 of the reactor 1.

According to FIG. 3 the total preheating of the reaction air is effected through the combustion apparatus 8. The heat exchanger 3 during this process merely serves to preheat the secondary air for the combustion apparatus 8. The waste gas freed from carbon black serves to heat the reaction air to temperatures between 600° and 1,250° C. The manner of further conducting the reaction according to FIG. 3 is identical with that in FIG. 2.

By the term waste gas there is intended the gas obtained along with the carbon black. It consists of 10–35 volume % steam and 65 to 90 volume % dry gas. In the dry gas there are contained as burnable components 10 to 18 volume % hydrogen, 12 to 15 volume % carbon monoxide and 0.5 to 2.0 volume % methane/acetylene. The remainder consists of the unburnable components carbon dioxide and nitrogen. The lower heating value for the waste gas is between 2,100–3,500 K Joule/Nm$^3$.

In the process of the invention in the burning of the waste gas in the premixing step, where secondary air and waste gas are mixed, a velocity of 45–55 m/sec can be maintained and in the burning step, where the true combustion occurs there is maintained a velocity of 5–15 m/sec. By means of the process of the invention it is possible to produce a temperature in the combustion apparatus of 1,000° to 1,300° C.

The combustion apparatus is equipped with a heat exchanger or there is connected to the outlet side of the combustion apparatus a heat exchanger, e.g. a pipe system of high temperature resistant metal, through which the reaction air for the furnace black process is led.

In comparison with the known process the process of the invention has the following advantages:

1. The temperature of the waste gas burned with secondary air is independent of the properties of the carbon black because no carbon black is present in the waste gases. The temperature can be increased to the extent permitted by the waste gases available and the construction materials of the heat exchanger of the combustion apparatus. 2. Since there is an exchange between solid-free and oil free gases (clean combustion gas/reaction air) there do not occur carbon black depositions and coke depositions on the surfaces of the exchangers. Therefore a far higher preheating, namely to 600°–1250° C. is possible.

3. The preheating is independent of the outer conditions and can be regulated as desired by the amount of the burned waste gases.

The process of the invention is further described and explained in the following examples. In the examples there were employed raw materials with the following characteristics:

| 1. Carbon black forming material | | |
|---|---|---|
| (carbon black forming oil) | | |
| density | g/ml | 1.083 |
| Distillations residue | g/100 ml | 2.9 |
| Residue according to | | |
| Conradson | % | 1.9 |
| Asphaltenes | % | 1.1 |
| Benzene insolubles | % | 0.02 |
| Boiling Properties | | |
| Beginning Boiling | °C. | 260 |
| 5Vol% | °C. | 280 |
| 10Vol% | °C. | 295 |
| 20Vol% | °C. | 310 |
| 30Vol% | °C. | 325 |
| 40Vol% | °C. | 333 |
| 50Vol% | °C. | 339 |
| 60Vol% | °C. | 346 |
| 70Vol% | °C. | 355 |
| 80Vol% | °C. | 363 |
| 90Vol% | °C. | 388 |
| 2. Natural gas | | |
| Carbon dioxide | 1.0Vol% | |
| Methane | 81.6Vol% | |
| Nitrogen | 13.8Vol% | |
| Ethane | 2.9Vol% | |
| higher hydrocarbons | 0.7Vol% | |
| 3. Hydrogen gas | | |
| Hydrogen | 85.0Vol% | |
| Methane | 13.5Vol% | |
| Carbon monoxide | 0.3Vol% | |
| Ethylene | 1.0Vol% | |
| higher hydrocarbons | 0.2Vol% | |

The process can comprise, consist essentially of, or consist of the steps set forth with the materials set forth.

DESCRIPTION OF THE PREFERRED EMBODIMENT

Example 1

A furnace black reactor according to German OS No. 2,530,371 (and related Rothbuhr U.S. application Ser. No. 699,973 filed June 25, 1976) is used for production of the carbon black. The combustion chamber had a diameter of 190 mm, the mixing chamber a diameter of 30 mm and the reaction chamber a diameter of 60 mm.

The mixing chamber and reaction chamber were lined with high temperature resistant Al$_2$O$_3$ containing a ramming mixture.

There were produced hot combustion gases by the burning of the natural gas with air which were then led through the constricted mixing chamber. The carbon black forming material was sprayed into the constricted mixing chamber, as a result of which there occurred a mixing and the carbon black formed in the reaction chamber. The reaction was quenched by spraying water in and after further cooling the carbon black was separated by a bag filter.

Example 1 compared two test runs:

(a) a blank experiment with a reaction temperature of 500° C.

(b) The same experiment in which, however, a portion of the resulting waste gases freed from carbon black was burned in a combustion apparatus and the resulting high temperature was used to further preheat the reaction air up to 820° C.

The burning of the waste gases was carried out as follows:

The waste gas resulting from the process having the composition

| 25.2% Vol | $H_2O$-vapor |
| 10.1% Vol | $H_2$ |
| 10.1% Vol | CO |
| 0.3% Vol | $CH_4$ |
| 0.2% Vol | $C_2H_2$ |
| 3.4% Vol | $CO_2$ |
| 50.7% Vol | $N_2$ | was burned with an addition of 0.56 $Nm^3$ of air per $Nm^3$ of waste gas while there was maintained a residence time of 1.5 seconds in the combustion chamber.

However, it must be noted that to attain comparable conditions the amount of carbon black forming material (amount of oil) inserted was so regulated that there was formed a carbon black of the same iodine adsorption, i.e. the same quality.

|  |  | 1a | 1b |
|---|---|---|---|
| Additional reaction air preheat by burning waste gas |  | No | Yes |
| Reaction air temperature | °C. | 500 | 820 |
| Reaction air amount | $Nm^3/h$ | 27.0 | 27.0 |
| Amount of natural gas | $Nm^3/h$ | 1.9 | 1.9 |
| Amount of carbon black forming material added | kg/h | 5,680 | 7,110 |
| Amount of carbon black produced | kg/h | 3,070 | 4,290 |
| Oil Yield | % | 54.0 | 60.3 |
| Analytical Data |  |  |  |
| Iodine adsorption | mg/g | 80 | 82 |
| BET-surface area | $m^2/g$ | 88.0 | 87.6 |
| Toluene extraction | % | 0.07 | 0.15 |
| rubber data |  |  |  |
| $a_f$-value |  | 2.16 | 2.13 |
| $t_f$ | (sec.) | 678 | 660 |
| $K_{V}{}^J \times 10^3$ | $min^{-1}$ | 212 | 206 |

The striking statement of this example is that by returning a portion of the waste gases freed from carbon black, burning of the waste gas for additional preheating of the reaction air to 820° C. there can be added substantially more carbon black forming material, more carbon black can be produced with otherwise equal amounts of reaction air and gas and the oil yield increases considerably.

EXAMPLE 2

In this example there were produced carbon blacks with constant sizes of surface area using the same carbon black forming apparatus as in Example 1. The surface area sizes were established by the iodine adsorption according to DIN 53582 (German Industrial Standard 53582). Deviating from Example 1 the temperature of the reaction air was increased in small steps. A further deviation was that in place of using the combustible gas natural gas there was added the hydrogen rich fuel gas according to point 3 above.

|  |  | 2a | 2b | 2c | 2e | 2d |
|---|---|---|---|---|---|---|
| Reaction air temperature | °C. | 500 | 600 | 700 | 800 | 920 |
| Reaction air amount | $Nm^3/h$ | 27.0 | 27.0 | 27.0 | 27.0 | 27.0 |
| Amount of hydrogen gas | $Nm^3/h$ | 5.1 | 5.1 | 5.1 | 5.1 | 5.1 |
| Amount of carbon black forming material | kg/h | 7,080 | 7,330 | 7,550 | 7,680 | 7,940 |
| Amount of carbon black produced | kg/h | 3,650 | 3,910 | 4,160 | 4,360 | 4,660 |
| Oil Yield | % | 51.5 | 53.3 | 55.1 | 56.8 | 58.7 |
| Iodine adsorption according to DIN 53 582 | mg/g | 82 | 85 | 82 | 85 | 83 |

From this example it can be perceived that with increasing temperature of the reaction there takes place a continuous constant increase in the amount of carbon black produced and the oil yield. Even at 920° C. there cannot be seen any flattening of this curve, so that even at still higher reaction air temperatures there can be counted on a further increase of the carbon black production and oil yield.

EXAMPLE 3

In this example there was used the same carbon black producing apparatus as is described in Example 1. As blank experiment there was used the standard 3a in which a reaction air temperature of 500° C. was present. Starting from the fundamental experiment in Experiment 3b of the burned waste gases from the production carbon black and substantially freed from carbon black were led into a combustion apparatus, burned with secondary air and the reaction air to produce a high temperature in pipes led through this high temperature so that a reaction air temperature of 820° C. was attained. In contrast to Example 1 the amount of natural gas was now reduced.

|  |  | 3a | 3b |
|---|---|---|---|
| Additional reaction air preheating through combustion of waste gas |  | No | Yes |
| Reaction air temperature | °C. | 500 | 820 |
| Amount of reaction air | $Nm^3/h$ | 27.0 | 27.0 |
| Amount of natural gas | $Nm^3/h$ | 2.6 | 1.3 |
| Amount of carbon gas forming material added | kg/h | 5,520 | 9,440 |
| Amount of carbon black produced | kg/h | 3,160 | 5,390 |
| Oil Yield | % | 56.6 | 57.1 |
| Iodine adsorption according to DIN 53 582 |  | 80 | 82 |

The example makes it clear that based on the procedure of the invention half of the combustion gas (fuel gas) energy can be saved and in spite thereof (at the same carbon black quality) high oil yields and hourly carbon black output is produced.

The entire disclosure of German priority application No. P 2827872.0 is hereby incorporated by reference.

What is claimed is:

1. In a process for the production of furnace black comprising spraying an oily carbon black forming material into a stream of hot combustion gases produced by reaction of fuel with reaction air, chilling and recovery of the carbon black by separation from the waste gases during which the reaction air is heated by means of the waste gases separate from the carbon black conducting conduit, the improvement comprising burning the waste gases in a combustion apparatus by means of secondary air in an amount to provide an oxygen excess over that required to burn the waste gases in order to heat the reaction air to a temperature between 600° and 1,250° C., and then introducing the thus heated reaction air into the process.

2. A process according to claim 1 wherein the reaction air is heated between 800° and 1,100° C.

3. A process according to claim 2 comprising heating the reaction air by heat exchange with the waste gases and subsequently bringing the reaction air to the final temperature by means of the combustion apparatus.

4. A process according to claim 2 comprising heating the secondary air in a heat exchanger by means of the waste gases.

5. A process according to claim 2 wherein in the burning of the waste gases with the secondary air there is used an amount of secondary air of 0.35 to 0.70 $Nm^3$ per $Nm^3$ of waste gas, an oxygen excess of 0.2 to 0.8 volume % and a residence time in the combustion apparatus of 0.5 to 1.5 seconds.

6. A process according to claim 5 wherein the amount of secondary air is 0.45 to 0.60 $Nm^3$ per $Nm^3$ of waste gas.

7. A process according to claim 1 comprising heating the reaction air by heat exchange with the waste gases and subsequently bringing the reaction air to the final temperature by means of the combustion apparatus.

8. A process according to claim 1 comprising heating the secondary air in a heat exchange by means of the waste gases.

9. A process according to claim 1 wherein in the burning of the waste gases with the secondary air there is used an amount of secondary air of 0.35 to 0.70 $Nm^3$ per $Nm^3$ of waste gas, an oxygen excess of 0.2 to 0.8 volume % and a residence time in the combustion apparatus of 0.5 to 1.5 seconds.

10. A process according to claim 9 wherein the amount of secondary air is 0.45 to 0.60 $Nm^3$ per $Nm^3$ of waste gas.

11. A process for the production of furnace black comprising producing a steam of hot combustion gases by reacting fuel with reaction air, spraying an oily carbon black forming material into said stream of hot combustion gases, chilling, recovering the carbon black by separation from the waste gases, burning the waste gases by means of secondary air in an amount to provide an oxygen excess over that required to burn the waste gases in a combustion apparatus, preheating the reaction air separate from the carbon black conducting conduit to a temperature between 600° and 1,250° C. by said burned waste gases and then mixing the thus heated reaction air with the fuel to form said stream of hot combustion gases.

* * * * *